May 18, 1937.    R. J. OLANDER    2,080,631
HAND BRAKE
Filed April 24, 1935    2 Sheets-Sheet 1
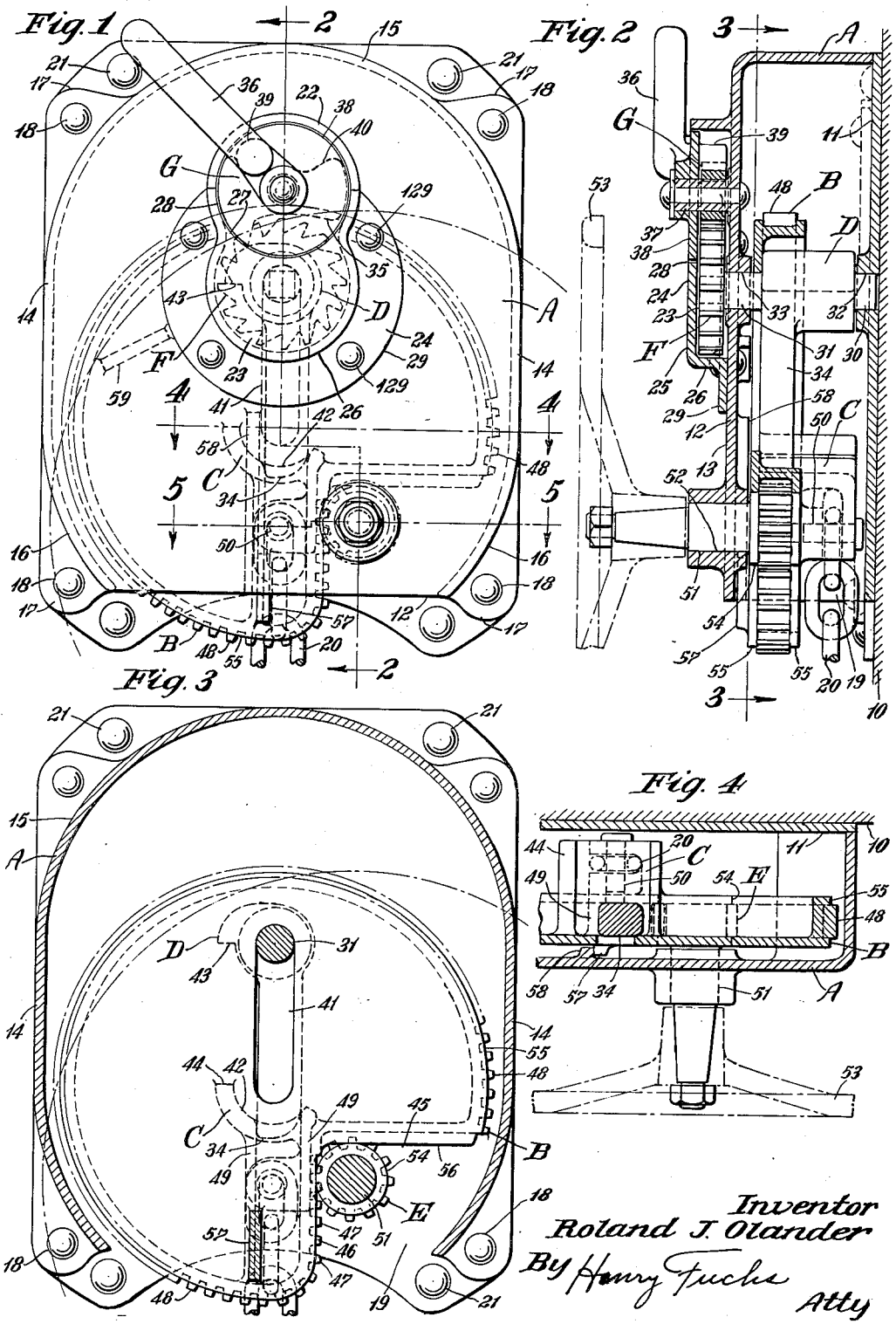
Inventor
Roland J. Olander
By Henry Fuchs
Atty

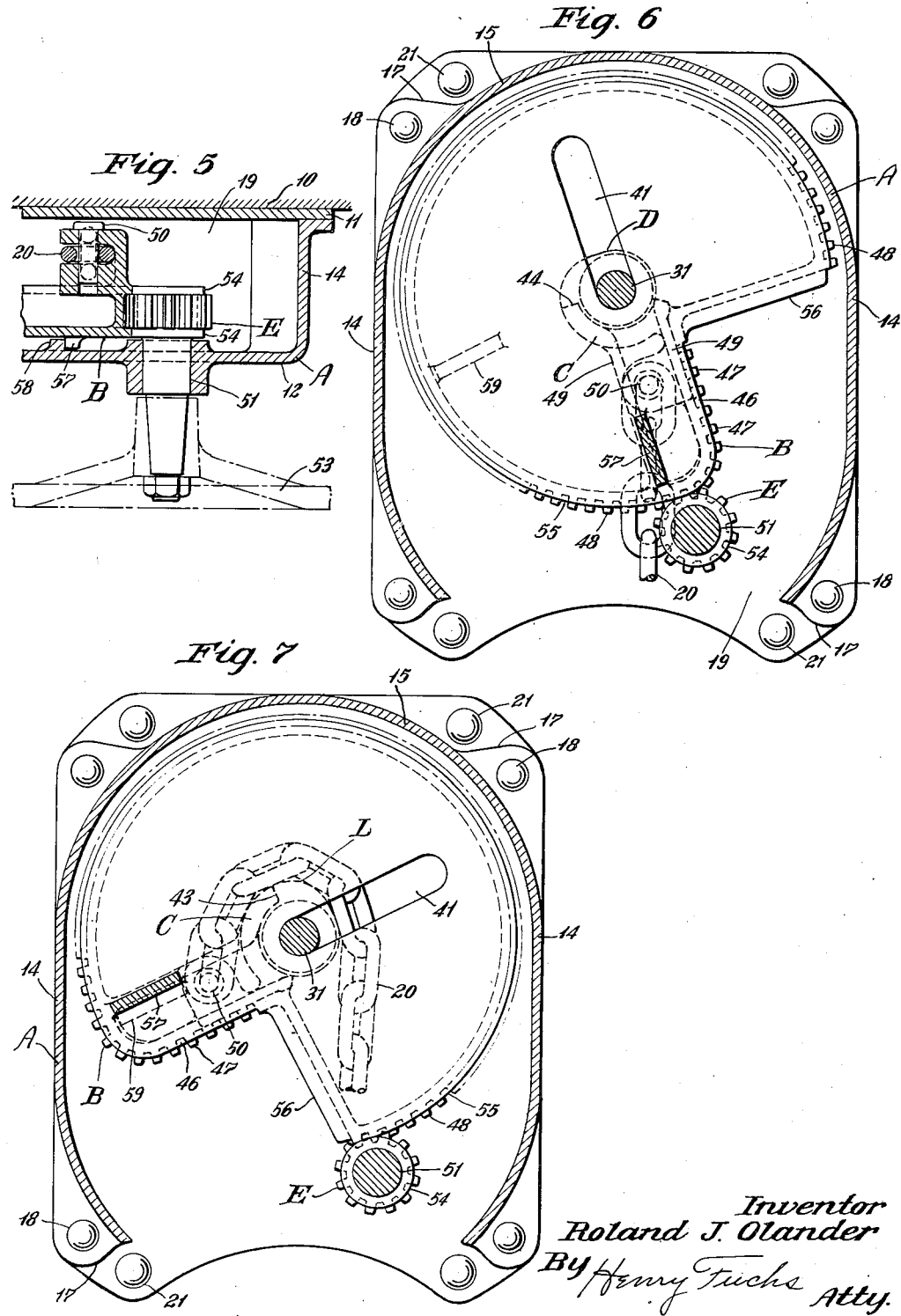

Patented May 18, 1937

2,080,631

UNITED STATES PATENT OFFICE 2,080,631

HAND BRAKE

Roland J. Olander, Chicago, Ill., assignor to W. H. Miner, Inc., Chicago, Ill., a corporation of Delaware Application April 24, 1935, Serial No. 18,007

20 Claims. (Cl. 74—505)

This invention relates to improvements in hand brakes of the power multiplying, gear driven type, especially adapted for railway cars.

One object of the invention is to provide a hand brake mechanism of the character specified, wherein is obtained quick take-up of the brake chain, followed by application of great power to effect final tightening of the brakes.

Another object of the invention is to provide a gear driven brake mechanism comprising a rotary winding element driven by power multiplying gear and pinion means, wherein quick take-up of the brake chain is effected by bodily displacing the winding element and final forceful application of the brakes is obtained by rotation of the winding element through operation of the power multiplying means comprising the pinion and gear.

A more specific object of the invention is to provide a brake mechanism of the character set forth in the preceding paragraph, wherein rotation of the pinion in brake tightening direction coacts with the gear to first lift the gear and the winding member to effect quick take-up of the brakes, followed by rotation of the gear through the medium of the driving pinion to effect high power application of the brake mechanism by rotation of the winding element.

A further object of the invention is to provide simple and efficient mechanism for quickly taking up the slack in the chain of the brakes and effecting final powerful application of the brakes, through displacement of the winding means to take up the slack and rotation of said winding means about its axis to finally apply the brakes, wherein the brake applying mechanism comprises a drum element fixed to a relatively large gear member and coaxial with said member, and a driving pinion cooperating with the gear to first displace the gear and drum element and then effect rotation of said gear and drum element to wind the chain on the drum, the gear being provided with the usual peripheral teeth and a substantially radially disposed rack portion merging with said peripheral teeth of the gear and forming a continuation thereof, whereby rotation of the pinion during application of the brakes first causes said rack portion to travel in a direction substantially tangential to the pinion to bodily displace the gear and drum element to effect quick take-up of the brake mechanism, until said gear is displaced to an extent to bring the pinion into mesh with the peripheral teeth of the gear, whereupon further continued rotation of the pinion effects rotary movement of the gear and winding drum element to forcibly apply the brakes through the chain being wound about said drum element.

Other objects of the invention will more clearly appear from the description and claims hereinafter following.

In the drawings forming a part of this specification, Figure 1 is a front elevational view of my improved hand brake mechanism, the operating hand wheel being indicated in dotted lines. Figure 2 is a vertical sectional view, corresponding substantially to the line 2—2 of Figure 1, the hand wheel of the brakes being indicated in dotted lines. Figure 3 is a transverse, vertical sectional view, corresponding substantially to the line 3—3 of Figure 2. Figure 4 is a horizontal sectional view, partly broken away, corresponding substantially to the line 4—4 of Figure 1. Figure 5 is a horzontal sectional view, partly broken away, corresponding substantially to the line 5—5 of Figure 1. Figures 6 and 7 are views, similar to Figure 3, but showing the parts of the mechanism in different positions.

In said drawings, 10 indicates the end wall of a railway car upon which my improved brake mechanism is mounted.

My improved brake mechanism comprises broadly a housing A; a bodily movable gear B; a chain winding drum comprising elements C and D, the element C being fixed to the gear; a driving pinion E; a ratchet wheel F; and locking means G for said ratchet wheel.

The housing A comprises a back plate 11 and a cover plate 12. The back plate forms the rear wall of the housing and has portions thereof extending beyond the top and bottom portions of the cover plate, as clearly shown in Figures 1, 3, 6, and 7. The cover plate 12 has a vertical front wall 13, side walls 14—14, and a top wall 15. The top wall 15 is curved and merges with the side walls 14—14. The lower end portions of the side walls 14—14 are curved inwardly as indicated at 16—16. The front wall of the housing is spaced from the back plate 11, and the gear B, the drum C—D, and the pinion E are accommodated between said walls. The cover plate 12 is provided with laterally projecting securing ears 17—17 and 17—17, and is fixed to the back plate 11 by rivets or any other well-known securing elements 18—18 and 18—18 extending through the ears 17—17 and 17—17 and the plate 11. The housing A is open at the bottom, as indicated at 19, to accommodate the brake chain 20. The complete housing is fixed to the end wall 10 of the car by securing elements 21—21 and 21—21 extending through the end wall 10 of the car and top and bottom projecting portions of the back plate 11. The cover plate 12 is further provided with a curved flange 22 which projects from the wall 13 and forms the top wall of a chamber 23, within which are housed the ratchet wheel F and locking means G. A cap plate 24 is fixed to the outer side of the front wall 13 of the housing A, said cap plate having a vertical wall 25 spaced from the wall 13 and forming the front wall of said chamber 23. The cap plate 24 also has a curved wall member 26 forming side and bottom walls of the chamber 23, said side walls merging with the wall 22. At the upper end, the front wall 25 of the cap plate 24 is cut away, as indicated at 27, thereby providing a circular opening 28 in the front portion of the chamber 23. As shown in Figure 1, the cap plate 24 has a securing flange 29 thereon which bears on the outer side of the front wall of the housing A. Rivets 129—129 and 129—129, extending through the flange 29 and the front wall 13 of the housing serve to fix the cover plate to said housing.

The chain winding drum, which comprises the elements C and D, has the element D thereof mounted for rotation about a fixed axis, while the element C is movable toward and away from the element D. As most clearly shown in Figure 2, the element D comprises cylindrical end portions 30 and 31, which are journaled respectively in bearing openings 32 and 33 provided in the back plate 11 and the front wall 13 of the cover plate 12 of the housing A. The journal portion 31 extends beyond the front wall 13 of the housing and into the chamber 23 and has the ratchet wheel F fixed thereto. The drum element D is further provided with a radially extending guide arm 34, which cooperates with the gear B in a manner hereinafter pointed out. The ratchet wheel F is normally held against backward rotation by the locking means G, comprising a locking dog 35 and an operating handle lever 36. The locking dog 35 is pivotally supported on a stud 37 projecting from the wall 13 of the housing A. The operating lever 36 comprises a disc portion 38, which is rotatably supported on the outer end portion of the stud 37 and closes the opening of the chamber 23. The disc 38 is further provided with an inwardly projecting lug 39 which has shouldered engagement with the dog 35, as shown in Figure 1, to maintain the dog in operative engagement with the ratchet wheel. When the operating handle lever 36 is swung to the right, from the position shown in Figure 1, the lug 39 engages the upper edge of the tail portion 40 of the dog to swing the toothed end of the dog upwardly and free the same from the ratchet wheel. As will be understood, when the lever 36 is swung back to the position shown in Figure 1 it will move the dog into engagement with the ratchet wheel through the medium of the lug 39.

The gear B, which has the element C of the drum fixed thereto, is provided with a radial slot 41 through which the bearing portion 31 of the member D extends. As will be evident upon reference to Figure 3, the bearing portion 31 of the element D forms a support for the gear B. The lower end portion of the slot 41 of the gear is concentric with the axis of rotation of said gear so that when the gear is lifted upwardly from the position shown in Figure 3 to that illustrated in Figure 6, the gear is rotatable about the axis of the bearing member 31. The drum element C is formed with a curved seat portion 42, which engages the lower side of the element D of the drum when the gear B and the drum element C are raised to the position shown in Figure 6. In order to lock the elements C and D against relative rotation, the element D is provided with a shoulder 43 which is engaged by a flat abutment face 44 on the element C of the drum. The gear B is cut away, as clearly shown at 45 in Figures 3, 6, and 7, to provide a substantially radially extending section 46 which has rack teeth 47 thereon adapted to mesh with the pinion E. The gear B is also provided with peripheral gear teeth 48 which merge with the teeth 47 of the rack, as shown in Figures 1, 3, 6, and 7. At opposite sides of the teeth 48, the gear is provided with flanges 55—55 adapted to cooperate with the pinion E. In order to properly guide the gear B in its movement during taking up of the slack of the brake chain, the gear is provided with parallel radial guide flanges 49—49, forming a guideway within which the radial arm 34 of the element D extends. To prevent backward rotation of the gear while in the position shown in Figures 1 to 5 inclusive, the gear is provided with a guide rib 57 which engages a fixed vertical guide rib 58 on the housing. The rib 57 also cooperates with a fixed stop rib 59 on the housing to arrest rotation as shown in Figure 7 to prevent disengagement of the gear from the pinion.

The brake chain 20 is anchored to the drum element C by means of a bolt or pin 50 extending through the end link of the chain and lugs provided on the drum element C.

The pinion E is supported by a rotary shaft 51, which is journaled in a bearing 52 provided on the front wall 13 of the housing A. As most clearly shown in Figures 2, 4, and 5, the usual hand wheel 53 is fixed to the outer end of the shaft 51, thereby providing means for rotating the pinion E. At opposite sides of the toothed portion, the pinion E is provided with disclike sections 54—54, which are formed integral therewith, and are engaged by the radial wall 56 of the gear B to act as a stop means for limiting downward movement of the gear and arresting the same in the position shown in Figure 3. The disclike sections 54—54 bear on the flanges 55—55 of the gear while the teeth of the pinion are in mesh with the rack teeth and the peripheral teeth of the gear to relieve the teeth from undue strain.

The operation of my improved hand brake mechanism, assuming the same to be in the complete released position shown in Figures 1, 2, 3, 4, and 5, is as follows: The hand wheel 53 is rotated in a clockwise direction to effect tightening of the brakes. Rotation in a clockwise direction, as viewed in Figure 1, is thus imparted to the pinion E by the hand wheel 53. Inasmuch as the gear B is held against rotation and guided for vertical movement, the operation of the pinion E will cause the gear to be lifted through operation of the rack 47, thereby quickly taking up the slack in the brake chain 20 until the drum element C is engaged with the drum element D, whereupon radial movement of the gear B is arrested. At this time, the rack 47 of the gear has cleared the pinion so that the gear is free to rotate. Further rotation of the pinion brings the parts to the position shown in Figure 6, with the teeth of the pinion meshing with the peripheral teeth of the gear, thereby effecting rotation of the gear B about the axis of the drum C—D and initiating winding of the chain on the drum. During further rotation of the parts from the position shown in Figure 6 toward that shown in Figure 7, the brake chain 20 is wound upon the drum and the brakes are fully tightened. As will be evident, the lifting of the gear during the first part of the brake tightening operation effects quick take-up of the brake chain and rotation of the gear through the action of the pinion produces great power multiplication during the final application of the brakes.

In releasing the brakes, the operation is substantially the reverse of that hereinbefore described, the chain being unwound from the drum during rotation of the gear from the position shown in Figure 7 to that shown in Figure 6 and the chain being dropped from the position shown in Figure 6 to that shown in Figure 3 during downward travel of the rack 47 with respect to the pinion E. As will be understood, during release of the brakes the locking dog 35 is thrown out of engagement with the ratchet wheel F.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a winding member; of means for rotatably supporting said winding member for rotation about a fixed axis; means for guiding said winding member for bodily movement toward and away from said first named means in a path radial to said fixed axis; and actuating means for bodily moving said winding member along said radial path and rotating said winding member while supported by said first named means.

2. In a hand brake mechanism, the combination with a winding member; of a gear fixed to said member and coaxial therewith, said gear having a radial rack portion; supporting means for said gear and winding member about which said gear and member are rotatable; means for guiding said gear and member in a path radial to the axis of rotation thereof about said supporting means; and a rotary driving pinion engageable with said rack gear for moving said gear and winding member in said radial path, said pinion being also engageable with the teeth of said gear to rotate the latter and said drum about the axis of said supporting means.

3. In a hand brake mechanism, the combination with a rotary gear member having a set of peripheral teeth and rack section disposed radially to the axis of rotation of said gear; of a winding member fixed to said gear and rotatable therewith; means for supporting said gear for rotation about a fixed axis; means for guiding said gear for bodily movement in a path radial to said axis; and a pinion engageable with said rack and peripheral teeth of said gear, said pinion being rotatable about a fixed axis.

4. In a hand brake mechanism, the combination with a rotary member having a guide arm radially extending therefrom; of means for supporting said member for rotation about a fixed axis; a gear member confined to sliding movement on said arm to either position said gear concentric with said rotary member or eccentric thereto; a winding member fixed to the gear and concentric therewith; and means for moving said gear along said guide arm and rotating said gear when disposed concentric with said rotary member.

5. In a hand brake mechanism, the combination with rotary winding means comprising two members' means supporting one of said members for rotation about a fixed axis; means for supporting the other member for movement in a direction radial to said axis; of a rotatable element fixed to said last named member and movable therewith radially of said axis; and operating means for bodily moving said element radially and effecting rotation thereof when concentric with said axis.

6. In a hand brake mechanism, the combination with a rotary member; of a gear rotatable about the axis of rotation of said member; means for guiding said gear for bodily movement toward and away from the axis of rotation of said member; a winding element coaxial with said gear and fixed thereto for rotation therewith; and actuating means for bodily moving said gear and winding element in a radial direction toward and away from said rotary member, and rotating said gear and winding element when positioned coaxial with said rotary member.

7. In a hand brake mechanism, the combination with a rotary gear member having a radial rack portion continuous with the teeth of the gear; of a rotary driving pinion meshing with the teeth of said gear and the rack portion thereof; a winding element fixed to said gear and coaxial therewith; supporting means about the axis of which said gear and winding element are rotatable; and means for guiding said gear in a path radial to the axis of said supporting means while holding said gear against rotation.

8. In a hand brake mechanism, the combination with a rotary shaft member; of a gear member having a radial rack portion continuous with the teeth of the gear; cooperating guide means on said gear and shaft for guiding said gear in a path radial to said shaft and parallel to said rack portion; a drum member fixed to said gear for rotation with said gear about the axis thereof; and a rotary pinion cooperating with said gear and the rack portion thereof.

9. In a hand brake mechanism, the combination with a rotary shaft member; of a gear member having a radial rack portion forming a continuation of the toothed portion of said gear; cooperating guide means on said gear and shaft for guiding said gear in a path radial to said shaft; a fixed guide member engaging the gear to hold the same against rotation while being moved in said radial path; a drum element fixed to said gear and coaxial therewith; and a rotary pinion cooperating with the teeth of the gear and of the rack portion of said gear.

10. In a hand brake mechanism, the combination with a rotary winding element; of supporting means for said element about the axis of which the same is rotatable; means for guiding said winding element for bodily movement toward and away from said supporting means; means for bodily moving and rotating said element; and means for holding said element against rotation while being moved toward and away from said supporting means.

11. In a hand brake mechanism, the combination with a rotary winding element; of supporting means about the axis of which said element is rotatable, said winding element being rotatable when its axis of rotation is concentric with the axis of said supporting means; means for guiding said element for bodily movement in a path radial to said axis of the supporting means; means for holding said element against rotation while being moved along said radial path; and means for moving said element along said radial path and rotating the same when the axis of rotation thereof is concentric with said axis of the supporting means.

12. In a hand brake mechanism, the combination with a rotary supporting shaft having a radial arm; of a gear member having a radial rack portion forming a continuation of the toothed portion of said gear; guide means on said gear cooperating with said arm for guiding the gear for movement in a path radial to the axis of rotation of said supporting shaft; stop means on said gear cooperating with the shaft for arresting bodily movement of the gear when the axis of rotation of the latter is concentric with the axis of rotation of said shaft; a winding element concentric with the axis of rotation of said gear; a fixed guide member cooperating with the gear for holding the same against rotation while in a position eccentric to said axis of the shaft; and an actuating pinion rotatable about a fixed axis and engageable with the toothed portion of the gear and said radial rack portion.

13. In a hand brake mechanism, the combination with a rotary supporting shaft having a chain winding section formed thereon; of a rotary member having a complementary chain winding section formed thereon; a brake chain anchored to said last named section; means for guiding said rotary member for bodily movement in a path radial to said shaft; and means for bodily moving said rotary member toward the axis of rotation of said shaft to bring the two winding sections together, and effecting rotation of said sections when brought together to wind the chain thereon.

14. In a hand brake mechanism, the combination with a rotary shaft having a chain winding section formed thereon; of a radial guide arm on said shaft; a gear member having a set of peripheral teeth and a radial rack portion forming a continuation of said set of teeth, said gear having a radial guide slot extending from the center of rotation thereof and through which said shaft extends; a radial guideway on said gear within which said arm is slidingly engaged; a fixed guide member radial to said shaft and engaging the gear to hold the same against rotation when said axis of rotation of the gear is eccentric to the axis of rotation of the shaft; a rotary pinion meshing with said rack and peripheral teeth of the gear; and a chain winding section complementary to said first named section, said complementary section being fixed to said gear and having the brake chain anchored thereto.

15. In a hand brake mechanism for railway cars having a flexible element leading to the brake mechanism proper of the car, the combination with a support; of a rotary winding member to which said flexible element is fixed, said member having a winding surface thereon; stop means on said support; cooperating guide means on said support and member confining the latter to bodily movement toward and away from said stop means; actuating means; means operated by said actuating means for moving said member toward and into engagement with said stop means to take up the slack in the flexible element; and means operated by said actuating means for rotating said member while the latter is engaged with the stop means to wind the flexible element on the winding member to tighten the brakes.

16. In a hand brake mechanism, the combination with a support; of a rotary winding member to which the brake chain is anchored, said member having a winding surface thereon; stop means on said support; cooperating guide means on said support and member confining the latter to sliding movement toward and away from said stop means; a rack fixed with respect to said winding member; a gear fixed to said winding member; rotary actuating means including a pinion engageable with the rack for sliding said winding member toward said support and into engagement therewith to take up the slack in the brake chain, said pinion disengaging the rack and engaging the gear when said member is engaged with said stop, to rotate said member to wind the chain thereon and tighten the brakes.

17. In a hand brake mechanism including a flexible tightening element, the combination with a support; of a rotary winding member to which said flexible element is fixed, said member having a winding surface thereon; means for guiding said winding member toward and away from said support and confining the same to sliding movement; a gear fixed to said winding member; a rack fixed with respect to the winding member; and a rotary driving pinion engageable successively with said rack and gear for first bodily moving the winding member toward and into engagement with said support to take up the slack and then, while said winding member is engaged with said support, rotating the gear and winding member to tighten the brakes.

18. In a hand brake mechanism including a flexible tightening element, the combination with a support; of a stop on said support; a rotary chain winding member to which said element is fixed; guide means confining said winding member to bodily movement toward and away from said stop; rotary actuating means; and means operatively connecting said actuating means and winding member for sliding the latter along said guide means and into engagement with said stop to take up the slack in the brake mechanism, and rotating said member while engaged with said stop to wind the flexible element thereon to tighten the brake chain and forcibly apply the brakes.

19. In a hand brake mechanism for cars including a brake chain leading to the brake mechanism proper of the car, the combination with a rotary winding element for said chain; of guide means engaging said element and confining the same to sliding movement in a direction lateral to its axis of rotation; actuating means; and means for transmitting movement from said actuating means to said winding element to move the latter along said guide means until disengaged therefrom and rotate said winding element when disengaged from said guide means.

20. In a hand brake mechanism for cars including a brake chain leading to the brake mechanism proper of the car, the combination with a rotary winding element; of means for guiding said element for sliding movement to a predetermined position; rotary actuating means; motion transmitting means operatively connecting said actuating means and element for bodily moving said element to said predetermined position and rotating the same after it has been so positioned; and releasable holding means engaged with said element until it reaches said predetermined position for holding said element against rotation during sliding movement thereof to said predetermined position.

ROLAND J. OLANDER.